United States Patent
Xie

(10) Patent No.: US 10,961,402 B2
(45) Date of Patent: Mar. 30, 2021

(54) PHOTOCHROMIC MIXTURE, FORMATION METHOD AND APPLICATION OF PHOTOCHROMIC DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Huafei Xie, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 321 days.

(21) Appl. No.: 15/751,108

(22) PCT Filed: Jan. 24, 2018

(86) PCT No.: PCT/CN2018/074044
§ 371 (c)(1),
(2) Date: Feb. 7, 2018

(87) PCT Pub. No.: WO2019/127792
PCT Pub. Date: Jul. 4, 2019

(65) Prior Publication Data
US 2020/0087521 A1   Mar. 19, 2020

(30) Foreign Application Priority Data
Dec. 28, 2017  (CN) .......................... 201711462436.2

(51) Int. Cl.
*C09D 5/29*      (2006.01)
*C09D 7/20*      (2018.01)
(Continued)

(52) U.S. Cl.
CPC ................ *C09D 5/29* (2013.01); *C03C 17/32* (2013.01); *C09B 56/00* (2013.01); *C09B 57/00* (2013.01);
(Continued)

(58) Field of Classification Search
None
See application file for complete search history.

(56) References Cited

U.S. PATENT DOCUMENTS 4,929,693 A * 5/1990 Akashi ................ C07D 498/10
359/241
7,608,207 B2 * 10/2009 Vassal ................ C08G 18/0823
252/182.2

(Continued)

FOREIGN PATENT DOCUMENTS

CN     1829780 A    9/2006
CN     1922283 A    2/2007
(Continued)

*Primary Examiner* — John J Figueroa
(74) *Attorney, Agent, or Firm* — Hemisphere Law, PLLC; Zhigang Ma

(57) ABSTRACT

A photochromic mixture including a photochromic material and a thermosetting transparent polymer material, which are uniformly mixed and dissolved in a solvent, is provided. A formation method of a photochromic device based on the photochromic mixture and a light-transmissive head-mounted display device with the photochromic device are further provided. In the photochromic mixture, the change in the structure of the photochromic material under UV light and room light causes a significant change in its absorption spectrum so the color changes. This property is utilized for the benefits: First, the contrast of the head-mounted display device under strong light irradiation is improved. The display effect is enhanced. Second, the damage to human eye by UV light at the natural environment is reduced. Third, under the same optical requirement, the required energy (Continued)

consumption of self-light-emitting elements in the light-transmissive head-mounted display device is correspondingly reduced. It's more energy saving and environmental protecting.

6 Claims, 1 Drawing Sheet

(51) Int. Cl.

| | | |
|---|---|---|
| C09D 7/41 | (2018.01) | |
| C03C 17/32 | (2006.01) | |
| C09B 56/00 | (2006.01) | |
| C09B 57/00 | (2006.01) | |
| C09D 163/00 | (2006.01) | |
| C09D 179/08 | (2006.01) | |
| C09D 183/16 | (2006.01) | |
| C09K 9/02 | (2006.01) | |
| G02B 27/01 | (2006.01) | |
| C08K 5/23 | (2006.01) | |
| C08K 5/3417 | (2006.01) | |
| C08K 5/45 | (2006.01) | |

(52) U.S. Cl.
CPC ............... *C09D 7/20* (2018.01); *C09D 7/41* (2018.01); *C09D 163/00* (2013.01); *C09D 179/08* (2013.01); *C09D 183/16* (2013.01); *C09K 9/02* (2013.01); *G02B 27/0172* (2013.01); *C08K 5/23* (2013.01); *C08K 5/3417* (2013.01); *C08K 5/45* (2013.01); *C09K 2211/1007* (2013.01); *C09K 2211/1014* (2013.01); *C09K 2211/1018* (2013.01); *G02B 2027/0118* (2013.01); *G02B 2027/0178* (2013.01)

(56) References Cited

U.S. PATENT DOCUMENTS

| | | | |
|---|---|---|---|
| 8,211,338 B2* | 7/2012 | He | G03C 1/73 252/586 |
| 8,545,984 B2* | 10/2013 | He | C07D 311/92 428/423.1 |
| 2003/0141490 A1* | 7/2003 | Walters | C09K 9/02 252/585 |
| 2004/0012002 A1* | 1/2004 | Vassal | C08G 18/6659 252/586 |
| 2009/0309076 A1* | 12/2009 | He | G02C 7/102 252/586 |
| 2011/0129678 A1* | 6/2011 | He | G03C 1/73 428/423.1 |

FOREIGN PATENT DOCUMENTS

| CN | 104969114 A | 10/2015 |
|---|---|---|
| CN | 105541784 A | 5/2016 |
| CN | 1639587 A | 9/2017 |
| CN | 107206712 A | 9/2017 |

\* cited by examiner

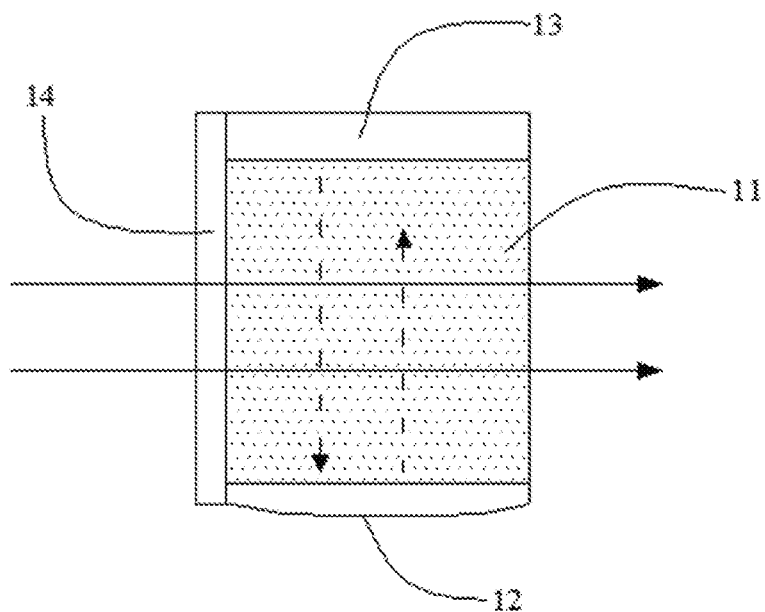

PHOTOCHROMIC MIXTURE, FORMATION METHOD AND APPLICATION OF PHOTOCHROMIC DEVICE

RELATED APPLICATIONS

The present application is a National Phase of International Application Number PCT/CN2018/074044, filed Jan. 24, 2018, and claims the priority of China Application No. 201711462436.2, filed Dec. 28, 2017.

FIELD OF THE DISCLOSURE

The disclosure relates to a technical field of head-mounted display devices, and more particularly to a photochromic mixture, a method for preparing a photochromic device based on the photochromic mixture, and the application of the photochromic device obtained by the method in a light-transmissive head-mounted display device.

BACKGROUND

Different from the virtual reality (VR) helmet, which completely isolates human's sight from the real world, the display effect of the augmented reality (AR) glasses is affected by the light in the real world. Therefore, the requirement of the AR glasses for the brightness is much higher than that of the VR helmet. In outdoor environments, AR encounters problems that the imaging and visibility become lower under strong light in the application of light-transmissive head-mounted display device. In this case, to increase the contrast, the light-transmissive head-mounted display device needs to have strong self-light-emitting brightness or block external light. However, the strong self-light-emitting requires high power consumption, thereby reducing the lifetime of the device. Therefore, in outdoor environments, it is necessary to block external light from transmitting through the light transmissive head-mounted display device so as to change the contrast.

Generally, when the user is in outdoors, the sunlight intensity is several orders of magnitude higher than the display light inside the AR glasses. Therefore, it is very necessary to make lenses in the AR glasses have automatically light-tuning technology.

SUMMARY

In order to solve the aforementioned problems in the prior art, the disclosure provides a photochromic mixture. The photochromic mixture can be used to fabricate a photochromic device for use in a light-transmissive head-mounted display device. It overcomes the problems of decrease in the contrast when the light-transmissive head-mounted display device is irradiated by strong light and mitigation of the display effect.

In order to achieve the above objective, the disclosure adopts the following technical solutions:

A photochromic mixture comprises a photochromic material and a thermosetting transparent polymer material. The photochromic material and the thermosetting transparent polymer material are uniformly mixed and dissolved in a solvent.

Furthermore, the mass ratio of the photochromic material to the thermosetting transparent polymer material in the photochromic mixture is in a range from 1:20 to 1:5.

Furthermore, the photochromic material undergoes a cis-trans isomer transition reaction, a ring-opening reaction, or an annulation reaction under ultraviolet light irradiation. The photochromic material undergoes a reverse reaction of the cis-trans isomer transition reaction, a reverse reaction of the ring-opening reaction, or a reverse reaction of the annulation reaction under room light irradiation.

Furthermore, the photochromic material is selected from at least one of an azobenzene derivative, a spiropyran derivative, and a bithienylene-based derivative.

Furthermore, the photochromic material has a structure as shown by any one of formulas 1-1, 1-3:

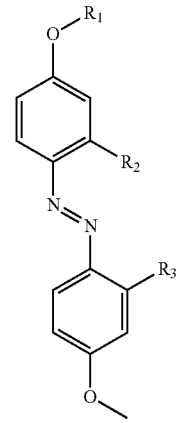

1-1

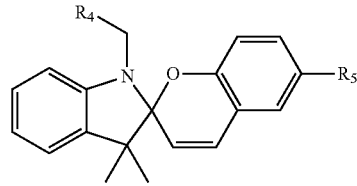

1-2

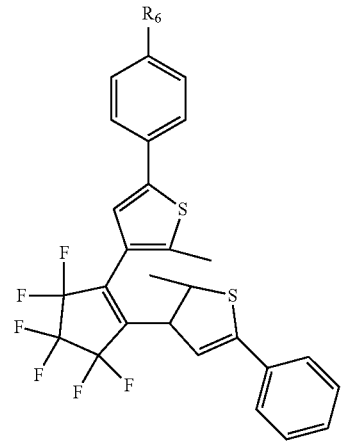

1-3

Wherein in the formula 1-1, $R_1$ is a functional group or a polymer branched chain, and $R_2$ and $R_3$ are each a functional group free of H. In the formula 1-2, $R_4$ and $R_5$ are each a functional group or a polymer branched chain. In the formula 1-3, $R_6$ is a functional group or a polymer branched chain.

Furthermore, in the formula 1-1, $R_2$ and $R_3$ are each selected from any one of —F, —Cl, —Br, —I and —NO$_2$.

Furthermore, the thermosetting transparent polymer material is selected from any one of epoxy resin, polysilazane, and polyimide. The solvent is aromatic hydrocarbon solvent.

Another objective of the disclosure is to provide a formation method of a photochromic device, comprising:

Step S1: coating the photochromic mixture as a coating solution on a surface of a glass.

Step S2: drying the glass coated with the photochromic mixture. The photochromic material and the thermosetting transparent polymer material in the photochromic mixture are cured to form a photochromic film so that the photochromic device is obtained.

Furthermore, in the step S2, the drying temperature is in a range from 100° C. to 150° C. The drying time is in a range from 5 min to 20 min.

Another objective of the disclosure is to further provide a light-transmissive head-mounted display device. The light-transmissive head-mounted display device comprises at least the photochromic device obtained by the above formation method.

In the disclosure, a photochromic mixture is prepared, and then the photochromic mixture is used as a coating solution to fabricate a photochromic device. The photochromic device is applied to a light-transmissive head-mounted display device. The change in the structure of a photochromic material under ultraviolet light and room light leads to a significant change in the absorption spectrum of the photochromic mixture so that the color changes. This property is utilized for the following benefits. First, the contrast of the head-mounted display device under strong light irradiation is improved, and the display effect is enhanced. Second, the damage to the human eye by ultraviolet light at the natural environment is reduced. Third, under the same optical requirement, the required energy consumption of self-light-emitting elements in the light-transmissive head-mounted display device is correspondingly reduced. It is more energy saving and environmental protecting. At the same time, the photochromic device according to the disclosure has great commonality. It can also be applied to other head-mounted display devices for improving the contrast.

BRIEF DESCRIPTION OF THE DRAWINGS

The above and other aspects, features and advantages of the embodiments of the disclosure will become clearer from the following descriptions with the accompanying drawings. In the figures:

FIG. 1 is a structural schematic view of a light-transmissive head-mounted display device according to an embodiment 3 of the disclosure.

DETAILED DESCRIPTION OF PREFERRED EMBODIMENTS

The embodiments of the disclosure will be described in detail below with reference to the accompanying drawings. However, the disclosure may be practiced in many different forms and should not be construed as limited to the specific embodiments set forth herein. Rather, these embodiments are provided to explain the principles of the disclosure and its practical application. Accordingly, those of ordinary skill in the art can understand various embodiments of the disclosure and various modifications, which are suitable for particular expected applications. In the drawings, the shapes and dimensions of elements may be exaggerated for clarity. The same reference numerals will be used throughout to represent the same or similar elements.

Embodiment 1

The embodiment provides a photochromic mixture comprising a photochromic material and a thermosetting transparent polymer material. The photochromic material and the thermosetting transparent polymer material are uniformly mixed and dissolved in a solvent.

Specifically, in the photochromic mixture, the mass ratio of the photochromic material to the thermosetting transparent polymer material in the photochromic mixture is in a range from 1:20 to 1:5. The role of the solvent is only for dissolving the photochromic material and the thermosetting transparent polymer material. Therefore, the amount of the solvent is not particularly limited. Preferably, the solvent is aromatic hydrocarbon solvent.

Photochromism is an essential property of the photochromic material. The phenomenon of photochromism refers that a compound undergoes a specific chemical reaction when irradiated with light of a certain wavelength so as to obtain a product. Due to change in the structure, its absorption spectrum significantly changes and the color changes. When irradiated with light of another wavelength or under heat, it is capable of returning to the original form.

More specifically, the photochromic material in the embodiment is a substance, which can undergo a cis-trans isomer transition reaction, a ring-opening reaction, or an annulation reaction under ultraviolet (UV) light irradiation, and further undergo a corresponding reverse reaction of the described reactions under room light irradiation.

Taking azobenzene as an example, azobenzene compounds contain a conjugated $\pi$ system. Azobenzene compounds have a strong absorption in the wave band from UV light to visible red light. Azobenzene compounds show a strong set of $\pi$-$\pi$* transition in the UV light region and a weaker set of n-$\pi$* transition in the visible light region. For most azobenzene compounds, under strong light irradiation, trans-isomers (high transmittance of visible light) are efficiently converted to cis-isomers (low transmittance of visible light). Under heat or room light, the cis-isomers can be fully reversible and converted to the trans-isomers.

Preferably, the photochromic material is selected from at least one of an azobenzene derivative, a spiropyran derivative, and a bithienylene-based derivative. For example, the photochromic material may have a structure as shown by any one of the following formulas 1-1, 1-2, and 1-3:

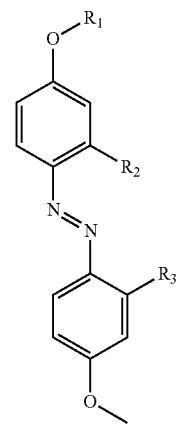

1-1

-continued 1-2

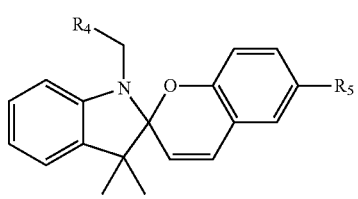

1-3

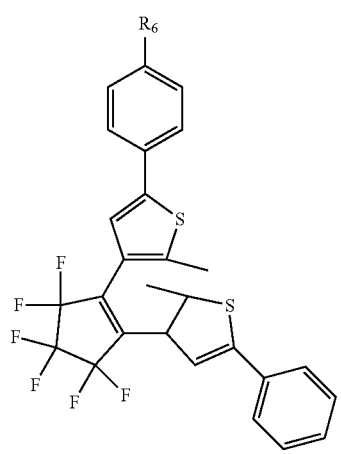

Wherein in the formula 1-1, $R_1$ is a functional group or a polymer branched chain, and $R_2$ and $R_3$ are each a functional group free of H. Preferably, $R_2$ and $R_3$ are any one of —F, —Cl, —Br, —I and —NO$_2$. This is because a functional group containing H, such as —OH, —NH$_2$, —HSO$_3$, etc., are prone to hydrogen bond such that the isomer transition of azobenzene derivatives is difficult and the converting rate of cis-trans isomer will be reduced greatly.

In the formula 1-2, $R_4$ and $R_5$ are each a functional group or a polymer branched chain. In the formula 1-3, $R_6$ is a functional group or a polymer branched chain.

It should be noted that the above-mentioned functional group refers to any general functional group in organic chemistry, such as a hydroxyl group, a carboxyl group, an amino group, a carbonyl group, etc. The above-mentioned polymer branched chain means that the whole structure shown by the formula 1-1, 1-2, or 1-3 is connected to a polymer in the form of a branched chain.

Furthermore, the thermosetting transparent polymer material functions to solidify and form a film during using. Therefore, it is preferably selected from any one of epoxy resin, polysilazane, and polyimide. Certainly, other transparent polymer materials, which are capable of being dissolved with the photochromic material and cured to form a film under heat, can be used. It is not specifically limited herein.

A specific photochromic process of three photochromic materials shown by the above formulas 1-1, 1-2 and 1-3 will be described in detail below.

When azobenzene derivatives as shown by the above formula 1-1 are irradiated with strong UV light (generally referring to UV light having a wavelength less than 360 nm), they undergo a cis-trans isomer transition reaction as shown by the following reaction formula 1. A substance as shown by the formula 2-1 is generated. As a result, the absorption spectrum significantly changes and the color changes. The converted structure as shown by the formula 2-1 undergoes a reverse reaction under room light irradiation and is converted into the structure as shown by the formula 1-1. Therefore, the photochromic property is realized.

1

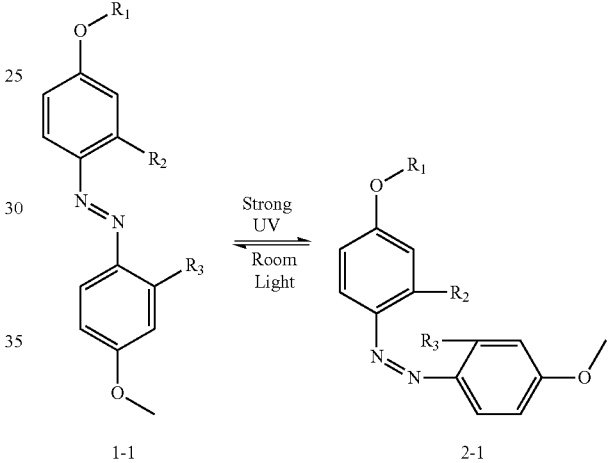

When spiropyran derivatives as shown by the above formula 1-2 are irradiated with strong UV light (generally referring to UV light having a wavelength less than 360 nm), they undergo a ring-opening reaction as shown by the following reaction formula 2. A substance as shown by the formula 2-2 is generated. As a result, the absorption spectrum significantly changes and the color changes. The converted structure as shown by the formula 2-2 undergoes a reverse reaction under room light irradiation and is converted into the structure as shown by the formula 1-2. Therefore, the photochromic property is realized.

2

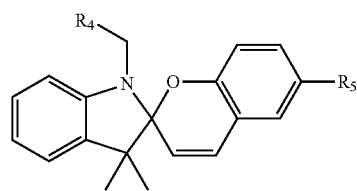

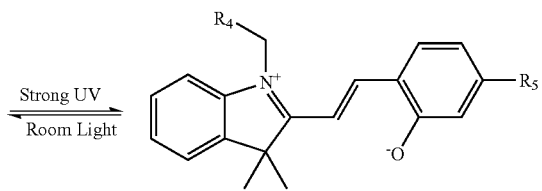

When bithienylene-based derivatives as shown by the above formula 1-3 are irradiated with strong UV light (generally referring to UV light having a wavelength less than 360 nm), they undergo a ring-opening reaction as shown by the following reaction formula 3. A substance as shown by the formula 2-3 is generated. As a result, the absorption spectrum significantly changes and the color changes. The converted structure as shown by the formula 2-3 undergoes a reverse reaction under room light irradiation and is converted into the structure as shown by the formula 1-3. Therefore, the photochromic property is realized.

time does not meet the target thickness, multiple coating and drying processes can be performed to obtain the desired thickness.

Embodiment 3

In the embodiment, on the basis of the photochromic device obtained in the above embodiment 2, a light-transmissive head-mounted display device is provided. As shown in FIG. 1, the light-transmissive head-mounted display device comprises at least a polarization beam splitter 11, a

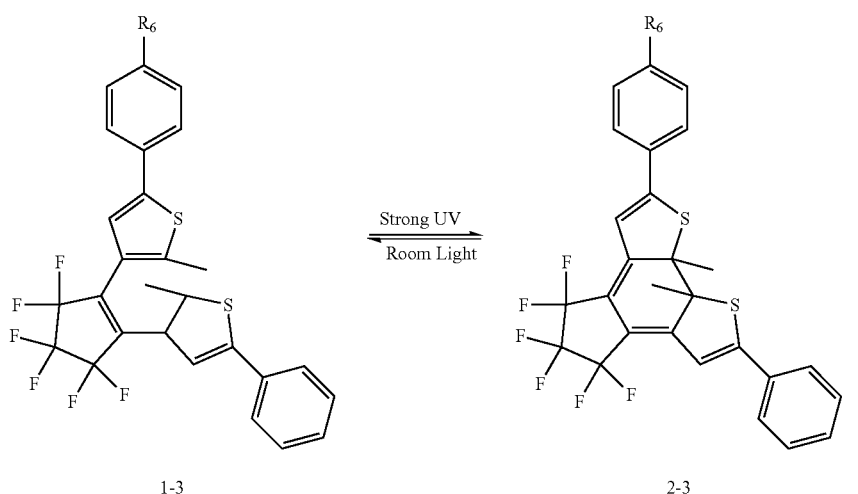

3

Embodiment 2

The embodiment provides a formation method of a photochromic device based on the photochromic mixture in the above embodiment 1. The formation method of a photochromic device comprises the following steps:

In the step S1, the photochromic mixture in the embodiment 1 is coated as a coating solution on the surface of a glass.

In general, the glass to be coated needs to be cleaned and vacuum-dried in advance.

In the step S2, the glass coated with the photochromic mixture is dried. The photochromic material and the thermosetting transparent polymer material in the photochromic mixture are cured to form a photochromic film so that the photochromic device is obtained.

Specifically, the general drying temperature is controlled in a range from 100° C. to 150° C. The drying time is controlled in a range from 5 min to 20 min.

Preferably, the drying step is carried out under vacuum.

It should be noted that the thickness of the photochromic film in the obtained photochromic device is specifically determined according to requirements and is not specifically limited herein. Generally, the greater the thickness is, the less the impact by ambient light on the obtained photochromic device is. In some cases, if the coating process for one reflector 12, a self-light-emitting element 13, and a photochromic device 14. The reflector 12 and the self-light-emitting element 13 are disposed on two opposite sides of the polarization beam splitter 11. The photochromic device 14 is disposed on one side of the polarization beam splitter 11, which is away from the user's eye. In FIG. 1, a straight line with an arrow indicates the direction of ambient light while a dotted line with an arrow indicates a direction of self-emitting light, which is emitted by the self-light-emitting element 13 and reflected by the reflector 12.

In this way, when the light-transmissive head-mounted display device is used, the impact by ambient light on the photochromic device 14, which faces the outside, is greatly reduced.

As a result, the light-transmissive head-mounted display device with the above-mentioned photochromic device 14 can provide the following benefits. First, the contrast under strong light irradiation is improved, and the display effect is enhanced. Second, the damage to the human eye by UV light at the natural environment is reduced. Third, under the same optical requirement, the required energy consumption of the self-light-emitting element 13 in the light-transmissive head-mounted display device is reduced. It is more energy saving and environmental protecting. At the same time, the photochromic device according to the disclosure is not limited to the light-transmissive head-mounted display device in the embodiment. The photochromic device according to the disclosure has great commonality. It can also be applied to other head-mounted display devices for improving the contrast.

Although the disclosure has been shown and described with reference to specific embodiments, it will be understood by those skilled in the art that various changes in form and details may be made without departing from the spirit and scope of the disclosure as defined by the appended claims and their equivalents.

What is claimed is:

1. A photochromic mixture, comprising a photochromic material and a thermosetting transparent polymer material, wherein the photochromic material and the thermosetting transparent polymer material are uniformly mixed and dissolved in a solvent;

wherein the photochromic material has a structure as shown by any one of formulas 1-1, 1-2, and 1-3:

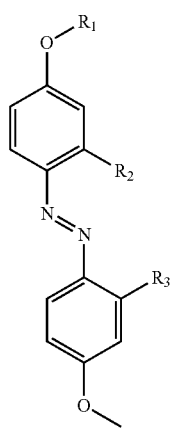

1-1

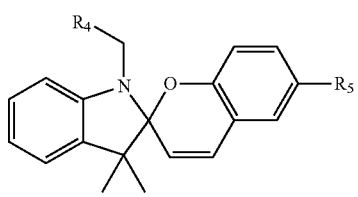

1-2

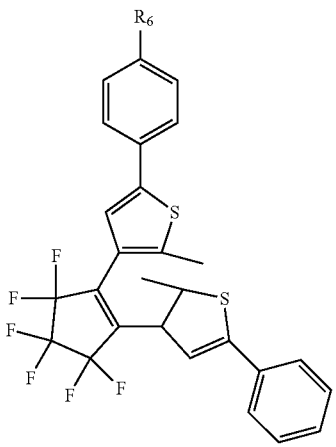

1-3 in the formula 1-1, an $R_1$ is a functional group or a polymer branched chain, and an $R_2$ and an $R_3$ are each a functional group free of H, in the formula 1-2, an $R_4$ and an $R_5$ are each a functional group or a polymer branched chain, in the formula 1-3, an $R_6$ is a functional group or a polymer branched chain.

2. The photochromic mixture as claimed in claim 1, wherein a mass ratio of the photochromic material to the thermosetting transparent polymer material in the photochromic mixture is in a range from 1:20 to 1:5.

3. The photochromic mixture as claimed in claim 1, wherein the photochromic material undergoes a cis-trans isomer transition reaction, a ring-opening reaction, or an annulation reaction under ultraviolet light irradiation, and wherein the photochromic material undergoes a reverse reaction of the cis-trans isomer transition reaction, a reverse reaction of the ring-opening reaction, or a reverse reaction of the annulation reaction under room light irradiation.

4. The photochromic mixture as claimed in claim 3, wherein the photochromic material is selected from at least one of an azobenzene derivative, a spiropyran derivative, and a bithienylene-based derivative.

5. The photochromic mixture as claimed in claim 1, wherein in the formula 1-1, the $R_2$ and the $R_3$ are each selected from any one of —F, —Cl, —Br, —I and —NO$_2$.

6. The photochromic mixture as claimed in claim 1, wherein the thermosetting transparent polymer material is selected from any one of epoxy resin, polysilazane, and polyimide, and wherein the solvent is aromatic hydrocarbon solvent.

* * * * *